United States Patent Office 2,924,526
Patented Feb. 9, 1960

2,924,526

DUCK FEEDS

Marvin C. Bachman, Jerome L. Martin, and Joseph M. Pensack, Terre Haute, Ind., assignors to Commercial Solvents Corporation, Terre Haute, Ind., a corporation of Maryland No Drawing. Application May 29, 1958
Serial No. 738,643

11 Claims. (Cl. 99—4)

Our invention relates to duck feeds, and more particularly, it relates to duck feeds containing a compound having the following structural formula:

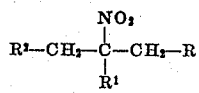

where R is a radical selected from the group consisting of hydrogen, methyl, hydroxy and carbamyl, $R^1$ is a radical selected from the group consisting of lower alkyl and lower hydroxyalkyl; and $R^2$ is selected from the group consisting of hydroxy and carbamyl.

The trend in modern human nutrition is toward the consumption of diets containing reduced amounts of animal fats. In line with this trend, animal nutritionists have sought ways to make the domesticated duck less greasy when cooked and therefore more acceptable to the modern palate.

We have now discovered that ducks fed the above nitroalcohols and nitrocarbamates are relatively lean and produce a tasty, less greasy food when baked.

Ducks are generally fed two types of rations. Young ducks are fed a high protein-low carbohydrate feed while older ducks are fed a low protein-high carbohydrate diet containing large amounts of energy. This type of diet causes rapid growth and produces a plump duck which is relatively greasy when cooked. Our additives are fed to ducks along with a high carbohydrate content diet, such as a diet containing about 15% total protein and about 1000 cals./lb., as little or no fat reduction is obtained when our additives are added to high protein content starter diets, such as a diet containing about 21% total protein and about 800 cals./lb.

The additives are evenly distributed in the feeds by blending the additive with about 19 times its weight of corn or soy products, blending this concentrate into 19 parts of feed and continuing this procedure until the desired concentration is obtained.

Our additives are fed to ducks as part of their daily ration and the final high energy ration should contain from about 0.0005 to about 0.06% of our additives for optimum fat reduction. If these amounts of our active ingredients are added to duck rations containing from about 12 to about 16% protein and from about 900 to about 1100 calories per pound, the ducks exhibit the desired type of growth and there is no marked decrease in feed utilization efficiency or rate of growth.

It is to be understood that not all of our compounds are active to the same degree and that the active ingredients of our invention may be utilized individually or as mixtures.

The following examples further illustrate our invention, but it is not intended that our invention be limited to the procedures, amounts of active ingredients, or described rations, but rather it is intended that all equivalents obvious to those skilled in the art be included within the scope of our invention.

EXAMPLE I

Duplicate lots of 15 day-old Pekin ducks were fed a pelleted feed containing the following:

| | | |
|---|---|---|
| Ground yellow corn | lbs | 1468 |
| Ground oats | lbs | 60 |
| Soybean oil meal, 44% | lbs | 99 |
| Fish meal, 60% | lbs | 150 |
| Dried fish solubles | lbs | 10 |
| Dried whey | lbs | 40 |
| B·Y Basic [1] | lbs | 40 |
| Alfalfa meal, 17% | lbs | 50 |
| Dicalcium phosphate | lbs | 30 |
| Ground limestone | lbs | 40 |
| $MnSO_4$, feed grade | lbs | 0.5 |
| CCC trace mineral [2] | lbs | 0.5 |
| Iodized salt | lbs | 5 |
| Vitamin A (10,000 u.) | gms | 272 |
| Vitamin $D_3$ (1,500 u.) | lbs | 4 |
| B·Y-21 [3] | lbs | 1 |
| Alpha-tocopherol acetate | gms | 7 |
| Niacin | gms | 40 |
| Menadione | gms | 0.5 |
| Proferm-6 [4] | lbs | 1 |
| Baciferm PB-10 [5] | lbs | 1 |

*Calculated analysis*

| | | |
|---|---|---|
| Protein | percent | 15.0 |
| Fat | do | 3.6 |
| Fiber | do | 3.4 |
| Calcium | do | 1.63 |
| Phosphorus | do | 0.77 |
| Energy | cal./lb | 1000 |
| Riboflavin | mg./lb | 3.29 |
| Niacin | mg./lb | 32.1 |
| Pantothenic acid | mg./lb | 5.3 |
| Choline | mg./lb | 363 |
| Vitamin A | units/lb | 4594 |
| Vitamin $D_3$ | units/lb | 1361 |

[1] Commercial Solvents Corporation commercial fermentation residues containing unknown growth factors.
[2] Calcium Carbonate Company trace mineral salt having a guaranteed analysis of:

| | Percent |
|---|---|
| Manganese, minimum | 12.20 |
| Iron, minimum | 9.60 |
| Calcium, maximum | 9.50 |
| Calcium, minimum | 7.50 |
| Copper, minimum | 0.73 |
| Zinc, minimum | 0.67 |
| Iodine, minimum | 0.38 |
| Cobalt, minimum | 0.26 |

[3] B·Y-21 is Commercial Solvents Corporation riboflavin feed supplement containing 8 mg. of riboflavin per gram of supplement.
[4] Proferm-6 is Commercial Solvents Corporation feed supplement containing 6 mg. of vitamin $B_{12}$ per pound of supplement.
[5] Baciferm PB-10 is Commercial Solvents Corporation feed supplement additive containing 7.5 grams of bacitracin per pound and 2.5 grams of procaine penicillin per pound.

At the end of 43 days the ducks were weighed, sacrificed, defeathered, finely ground and homogenized to form a liquid blend which was then ether extracted and analyzed. The ducks weighed on an average of 6.18 pounds at the end of the test and had consumed 2.95 pounds of feed per pound of weight gain. The duck carcasses had the following composition: 35.2% fat, 12.8% protein, 50.2% water, and 2.7% ash.

EXAMPLE II

The procedure of Example I was carried out except that 100 grams of 2-nitro-2-methyl-1-propanol were added to the basal ration by blending the alcohol into the feed during mixing. At the end of the 43 day test period the ducks averaged 6.25 pounds of weight and had consumed 2.94 pounds of food for every pound of weight gain. The duck carcasses had the following composition: 32% fat, 12.1% protein, 53.0% water and 2.9% ash.

EXAMPLE III

The process of Example I was followed except that 100 grams of 2-nitro-2-propyl-1,3-propanediol dicarbamate were added to the ration of Example I. At the end of the 43-day test period the ducks averaged 5.88 pounds weight and had gained one pound of weight for every 2.98 pounds of feed consumed. The ducks were found to have the following body compositions: 32.7% fat, 12.8% portein, 52.2% water, and 2.5% ash.

Now having described our invention, what we claim is:

1. A duck feed containing as an essential active ingredient a small but effective amount to reduce the formation of adipose tissue of a compound having the following structural formula:

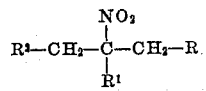

where R is a radical selected from the group consisting of hydrogen, methyl, hydroxy, and carbamyl, $R^1$ is a radical selected from the group consisting of lower alkyl and lower hydroxyalkyl, and $R^2$ is selected from the group consisting of hydroxy and carbamyl.

2. A nutrient feed for ducks containing as an essential active ingredient a small but effective amount to reduce the formation of adipose tissue of a compound selected from the group consisting of compounds having the following structural formula:

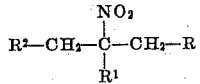

where R is a radical selected from the group consisting of hydrogen, methyl, hydroxy, and carbamyl, $R^1$ is a radical selected from the group consisting of lower alkyl and lower hydroxyalkyl; and $R^2$ is selected from the group consiting of hydroxy and carbamyl, and mixtures thereof.

3. A duck feed comprising from about 0.0005 to about 0.06% by weight of a compound having the following structural formula:

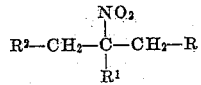

where R is a radical selected from the group consisting of hydrogen, methyl, hydroxy, and carbamyl; $R^1$ is a radical selected from the group consisting of lower alkyl and lower hydroxyalkyl; and $R^2$ is selected from the group consisting of hydroxy and carbamyl in a nutrient feed.

4. In a process for the production of ducks having reduced amounts of adipose tissue, the step which comprises feeding said ducks a nutrient ration containing a small but effective amount to reduce the formation of adipose tissue of a compound having the following structural formula:

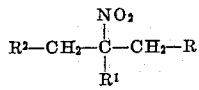

where R is a radical selected from the group consisting of hydrogen, methyl, hydroxy, and carbamyl; $R^1$ is a radical selected from the group consisting of lower alkyl and lower hydroxyalkyl; and $R^2$ is selected from the group consisting of hydroxy and carbamyl.

5. In a process for the production of ducks having reduced amounts of adipose tissue, the step which comprises feeding said ducks a nutrient ration containing from about 0.0005 to about 0.06% by weight of a compound having the following structural formula:

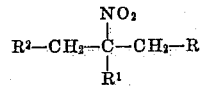

where R is a radical selected from the group consisting of hydrogen, methyl, hydroxy, and carbamyl; $R^1$ is a radical selected from the group consisting of lower hydroxyalkyl; and $R^2$ is selected from the group consisting of hydroxy and carbamyl.

6. A duck feed comprising from about 0.0005 to about 0.06% by weight of 2-nitro-2-methyl-1-propanol in a nutrient feed.

7. A duck feed comprising from about 0.0005 to about 0.06% by weight of 2-nitro-2-ethyl-1-propanol in a nutrient feed.

8. A duck feed comprising from about 0.0005 to about 0.06% by weight of 2-nitro-2-methyl-1-propanol carbamate in a nutrient feed.

9. A duck feed comprising from about 0.0005 to about 0.06% by weight of 2-nitro-2-propyl-1,3-propanediol in a nutrient feed.

10. A duck feed comprising from about 0.0005 to about 0.06% by weight of 2-nitro-2-propyl-1,3-propanediol dicarbamate in a nutrient feed.

11. A duck feed comprising from about 0.0005 to about 0.06% by weight of tris(hydroxymethyl)nitromethane in a nutrient feed.

References Cited in the file of this patent

Slater: Jr. Am. Pharm. Assoc. Scient. Ed. 43 (1954), pp. 547–50.

Mills: Proc. Soc. for Exptl. Biol. and Med. 96 (October 1957), pp. 100–2.

Dupont: Agr. News Letter, Summer 1957, 25, pp. 3 and 4.